US008650414B2

(12) United States Patent
Jayakumar et al.

(10) Patent No.: US 8,650,414 B2
(45) Date of Patent: Feb. 11, 2014

(54) LOGIC DEVICE HAVING STATUS AND CONTROL REGISTERS FOR RECORDING THE STATUS AND CONTROLLING THE OPERATION OF MEMORY SLOTS SUCH THAT EACH MEMORY SLOT IS IDENTIFIED USING A BUS ADDRESS AND PORT NUMBER

(75) Inventors: Sarathy Jayakumar, Portland, OR (US); Gopal R. Mundada, Olympia, WA (US); Palsamy Sakthikumar, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 12/890,222

(22) Filed: Sep. 24, 2010

(65) Prior Publication Data

US 2012/0079306 A1 Mar. 29, 2012

(51) Int. Cl.

*G06F 1/00* (2006.01)
*G06F 13/00* (2006.01)
*G06F 3/00* (2006.01)
*G06F 11/00* (2006.01)

(52) U.S. Cl.

USPC ............... 713/300; 710/302; 710/104; 710/8; 714/12

(58) Field of Classification Search

USPC ............. 710/1, 62, 9, 113; 713/320; 711/172, 711/106; 340/691.1; 365/51
See application file for complete search history.

(56) References Cited

U.S. PATENT DOCUMENTS 6,098,117 A * 8/2000 Foote et al. ........................ 710/8
6,247,079 B1 * 6/2001 Papa et al. ..................... 710/302
6,314,525 B1 * 11/2001 Mahalingham et al. ..... 714/4.12
6,633,916 B2 * 10/2003 Kauffman ..................... 709/229
6,640,272 B1 * 10/2003 Hartwell et al. .............. 710/104
6,704,825 B1 * 3/2004 Lascu et al. ................... 710/302
6,883,055 B2 * 4/2005 Chen et al. .................... 710/302
7,350,089 B2 * 3/2008 Mundada et al. ............. 713/300
7,437,496 B2 * 10/2008 Oster ............................ 710/302
2003/0131170 A1 * 7/2003 Chen et al. .................... 710/302
2004/0243725 A1 * 12/2004 Yakovlev et al. ................. 710/1
2006/0282578 A1 * 12/2006 Lee ................................ 710/62
2008/0209077 A1 * 8/2008 Im .................................... 710/9
2009/0147557 A1 * 6/2009 Lahtinen et al. ................ 365/51
2009/0210069 A1 * 8/2009 Schultz et al. .................... 700/7
2009/0254732 A1 * 10/2009 Dang et al. .................... 711/172
2010/0064111 A1 * 3/2010 Kunimatsu et al. ........... 711/161
2011/0131432 A1 * 6/2011 Berke et al. ................... 713/320
2011/0205078 A1 * 8/2011 Hua et al. .................. 340/691.1
2011/0296098 A1 * 12/2011 Sauber et al. ................. 711/106
2012/0151109 A1 * 6/2012 Cheah et al. .................. 710/113

* cited by examiner

*Primary Examiner* — Thomas Lee
*Assistant Examiner* — Aurel Prifti
(74) *Attorney, Agent, or Firm* — Blakely, Sokoloff, Taylor & Zafman LLP

(57) ABSTRACT

Memory reconfiguration during system run-time is described. In one example, a system includes a memory slot to carry a memory board and to connect the memory board to a memory controller for read and write operations, a logic device having a plurality of status registers to record the status of the memory slot and a plurality of control registers to control the operation of the memory slot, and a bus interface coupled through direct signal lines to the memory slot to communicate status and control signals with the memory slot and coupled through a serial bus to the logic device to communicate status and control signals with the logic device.

23 Claims, 5 Drawing Sheets

131-1 IOX 105-1 105-2 MEM CTRL 103 PROCESSOR 101 105-3 105-4 IOX 131-2 VPP 133 137
PROCESSOR 102 MEM CTRL 104 VPP 133 105-5 105-6 105-7 105-8 IOX 131-3 IOX 131-4 137
DISPLAY 113 109-1 109-2 109-3 109-4 IOH 107 POWER CTRL 127
NETWORK 119 WIRELESS INTERFACE 121 AUDIO I/O 123 ICH 111 MASS STORAGE 113 PERIPHERAL DEVICES 115 USER INTERFACE 117
BIOS 125 100

IOX
131-1
IOX
131-2
IOX
131-3
IOX
131-4
137
137
105-1
105-2
105-3
105-4
105-5
105-6
105-7
105-8
MEM CTRL 103
VPP
133
MEM CTRL 104
VPP
133
PROCESSOR 101
PROCESSOR 102
POWER CTRL 127
IOH 107
109-1
109-2
109-3
109-4
DISPLAY 113
ICH 111
BIOS 125
MASS STORAGE 113
PERIPHERAL DEVICES 115
USER INTERFACE 117
NETWORK 119
WIRELESS INTERFACE 121
AUDIO I/O 123
100

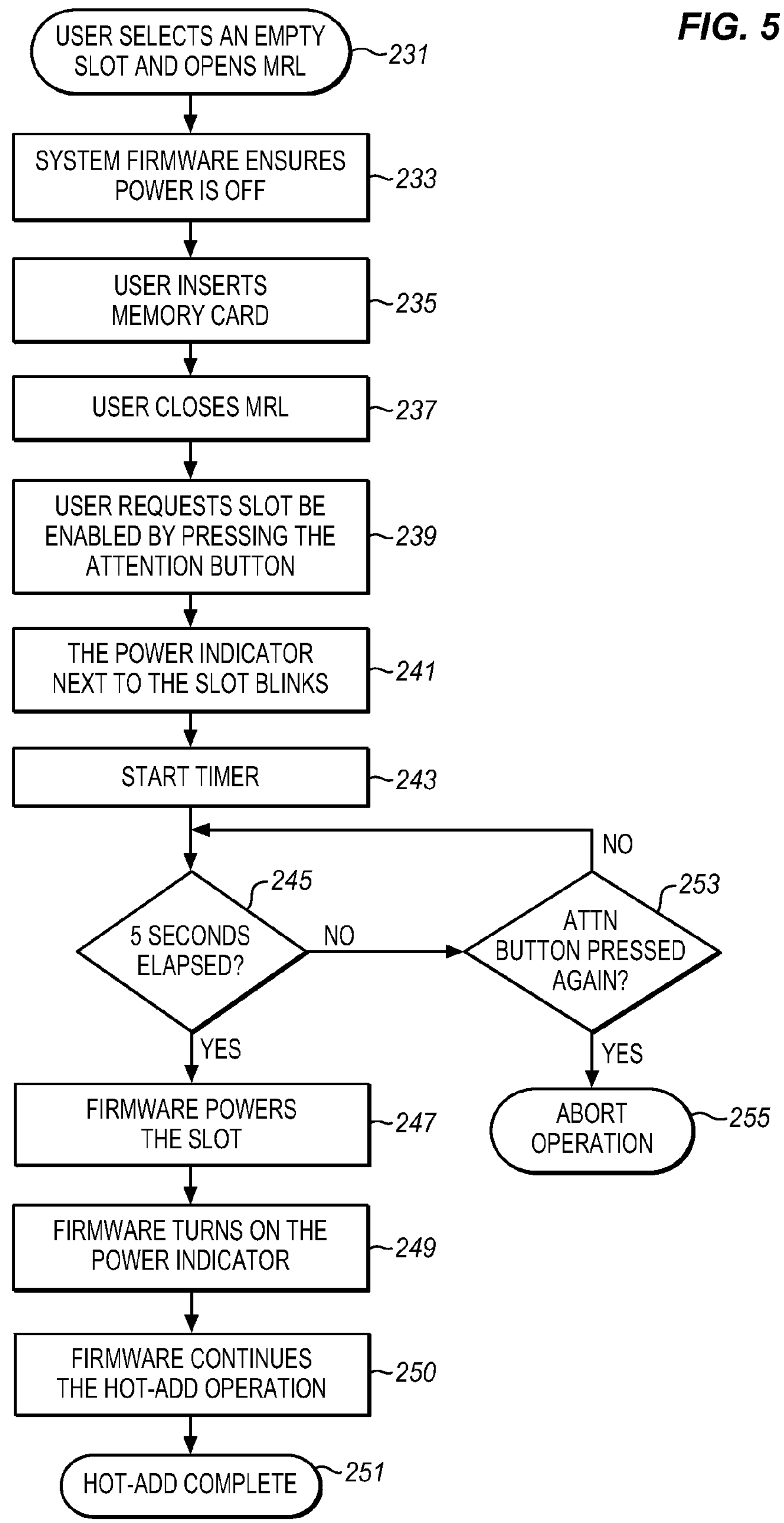

FIG. 5
USER SELECTS AN EMPTY SLOT AND OPENS MRL
231
SYSTEM FIRMWARE ENSURES POWER IS OFF
233
USER INSERTS MEMORY CARD
235
USER CLOSES MRL
237
USER REQUESTS SLOT BE ENABLED BY PRESSING THE ATTENTION BUTTON
239
THE POWER INDICATOR NEXT TO THE SLOT BLINKS
241
START TIMER
243
5 SECONDS ELAPSED?
245
NO
YES
ATTN BUTTON PRESSED AGAIN?
253
NO
YES
FIRMWARE POWERS THE SLOT
247
ABORT OPERATION
255
FIRMWARE TURNS ON THE POWER INDICATOR
249
FIRMWARE CONTINUES THE HOT-ADD OPERATION
250
HOT-ADD COMPLETE
251

LOGIC DEVICE HAVING STATUS AND CONTROL REGISTERS FOR RECORDING THE STATUS AND CONTROLLING THE OPERATION OF MEMORY SLOTS SUCH THAT EACH MEMORY SLOT IS IDENTIFIED USING A BUS ADDRESS AND PORT NUMBER

FIELD

The present description relates to memory hot swap in computer systems and in particular to hot removal and installation using serial bus connection to a memory interface.

BACKGROUND

High-end server computing systems are required to maintain very high Reliability, Availability and Serviceability (RAS), typically over 99.99%. One feature of servers that is provided to enhance RAS is referred to as memory hot plug. Memory hot plug allows an administrator to swap out a system memory board, whether to add memory capacity, add memory speed, or do a mirror replace, all in runtime without bringing the system down. The operation includes a hot removal and a hot add.

Since the system processors use system memory to store current states, transactions, instructions and intermediate results, removing a memory board will cause the system to fail. To do a memory hot swap, the system must be configured to allow for such a process.

Typically, such servers provide for handling hot-plug events, using signals to the system that allow the system to accommodate the loss of a memory board before the memory board is removed and to allow the system to allow for the addition of a memory board after one is added. The signals can include an Attention button press, power control, Attention and Power Indicators, Manual Retention Latch sensors etc. These signals are communicated to the platform firmware or BIOS (Basic Input/Output System) and the platform firmware drives the status indicators and power to the memory riser slot that carries the corresponding memory board.

The signals that allow for memory hot swaps are generated, handled, and implemented differently on different hardware platforms and by different designers and manufacturers. They are adapted to different systems by the same designers based on various factors such as routing and placement considerations and form factor. This, in turn, requires parts suppliers to create different parts for different designs or more expensive parts that can be adapted to different designs. It also makes it difficult for administrators to manage systems that use components with different designs. The overall development costs for each system are also higher.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5 is process flow diagram of adding memory during system run-time according to an embodiment of the present invention.

DETAILED DESCRIPTION

A virtualized pin port mechanism may be used to standardize a memory hot-plug controller and to tie the memory hot plug controller to the silicon and not to the platform. This lowers the product development cost for each platform and reduces the amount of surface area required on a motherboard or system board to accommodate the system.

In one embodiment of the invention, a Virtualized Pin Port (VPP) reduces the pin count on the silicon by providing a serial bus-based interconnect from a memory controller to an Input/Output Expander (IOX). It abstracts this interconnect and removes it from the software and firmware systems. The VPP can be used to provide a 1-to-1 mapping between a set of control and status registers and corresponding actual physical signals. A serial bus allows this connection using only 2 pins on the silicon.

In one embodiment of the invention, each memory hot-plug slot has a set of signals that can be used by firmware to control the slot power and the slot power indicators. Another set of signals can be used to indicate to the firmware the status of the slots (such as attention button press etc).

A typical memory hot-plug operation allows a user to remove a memory board, such as a system random access memory (RAM) card from a memory card slot in a system board while the system is running. It also allows the user to add a memory card into an empty slot of a system board while the system is running. The signals used for a typical memory hot-plug operation are: a. Power ON/OFF control; b. Power Indicator Control; c. Attention Indicator Control; d. Attention status; e. Presence Detect (PD); and f. Manually Operated Retention Latch (MRL) Status. However, more or fewer signals may be used depending on the particular embodiment. These signals add up to six hot-plug signals per hot-plug slot. With a typical eight or more slots used in a server and often four slots in a typical mini-tower personal computer, there will be 24 or 48 or more additional pins in the silicon to support the multiple hot-plug slots.

In one embodiment, to avoid this increase in pin count per hot-plug slot, and to reduce the design cost of increasing or decreasing the number of slots in a system, a parallel-serial-parallel converter is used, as shown below.

Figure 1:
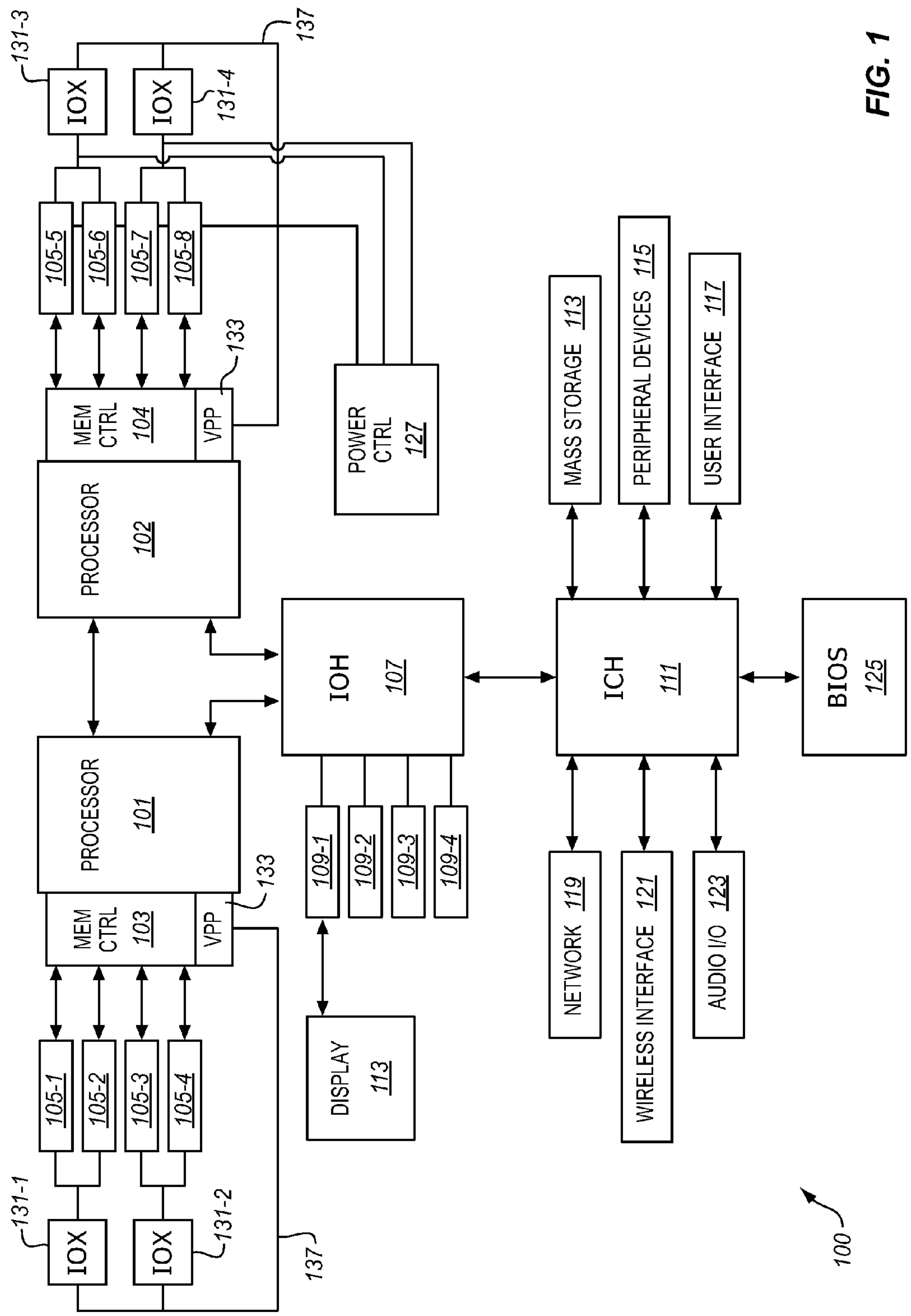
FIG. 1 is a block diagram of a computer system with reconfigurable memory according to an embodiment of the invention.

Referring to FIG. 1, a computer system 100 is shown according to an embodiment of the invention. The computer system may be server, a work station, a personal computer, a media server, or any of a variety of other computer systems. The computer system 100 includes a pair of processors 101, 102. Each processor includes a memory controller 103, 104. Each memory controller is connected to a set of memory interfaces 105-1 to 105-8. Each memory interface may include a DIMM (Dual In-line Memory Module) slot. The memory interface may also include indicator lights, buttons and sensors as described in more detail below.

Each processor is connected to the other processor through a shared databus and also to an input/output hub (IOH) 107. The input/output hub can be connected to a variety of different devices these can include PCI (peripheral component interface) or PCI Express connectors 109-1 to 109-4 and to an input/output controller hub (ICH) 111. The PCI interfaces 109 are typically coupled to graphics engines, but may also support interfaces to other peripheral components. The graphics cards may be coupled to displays 113 for a user interface. Such a display may be a touch screen interface depending on the particular application. While an IOH and ICH are shown, the present invention may also be applied to systems with a north bridge and south bridge, integrated chipset, or any other supporting chipset or hub configuration.

The input/output controller hub 111 is shown as connected to a mass storage device 113, and other peripheral devices using peripheral connections such as USB (Universal Serial Bus), PS2, Light Peak, Firewire, Bluetooth, or any of a variety of other peripheral interfaces. The system also includes a user interface 117 coupled to the input/output controller hub. Such a user interface may include a keyboard, a mouse, a track pad, a camera or any of a variety of other devices depending on the particular application. The input/output controller hub also connects to a network interface 119 which may be wired or wireless. A wireless interface 101 such as Wi-Fi, WiMax or any of a variety of other 3G or 4G interfaces. Audio input/output 123 may also be coupled to the I/O controller hub. For system operation, the input/output controller hub may also be coupled to a BIOS (Basic Input/Output System) or firmware system 125.

The input/output controller hub may be coupled to fewer or more devices than those shown and additional devices may be coupled through those devices shown in FIG. 1. In addition, the particular configuration of hubs and connections may be rearranged to suit any particular application. For example the graphics interfaces may be incorporated into the processors or into the input/output controller hub. The memory interfaces may also be coupled through the input/output hub or the input/output controller hub. In addition, some of the connections shown may be duplicated at different components in the system architecture.

Each of the memory interfaces 105 is also coupled to an input/output expander (IOX) 131-1 to 131-4 in the illustrated embodiment each input/output expander is connected two memory interfaces 105. In the example of eight memory interfaces four input/output expanders are used. These connections are described in more detail below. The input/output expanders may be coupled to many different devices. In the illustrated example, each input/output expander is coupled to a virtualized pin port (VPP) 133 for each memory controller. The input/output expanders are also coupled to the power control logic 127 which, through a separate line, controls power to each memory slot or memory riser.

In the illustrated embodiment, there are two processors 101, 102 each with its own memory controller 103, 104. Each memory controller has its own VPP 133 and each VPP is coupled to its respective IOX units corresponding to its own memory interfaces 105. As a result, for the right side processor 102 there are four memory interfaces 105. Two memory interfaces are coupled to each IOX 131 and the two IOX's are coupled to the same VPP 133. More or fewer memory interfaces may be controlled by the same memory controller each coupled to their own respective IOX units.

Similarly, the memory interfaces 105-1 to 105-4 for the left side processor 101 and memory controller 103 are coupled through respective IOX units to a separate VPP 133 for the left side processor 101. This particular physical configuration can be modified depending on the particular application. For example, for a single processor system, a single memory controller and corresponding VPP may be used. Alternatively, the two processors may share memory interfaces 105 and a single memory controller 133. Additional processors and additional memory interfaces may also be used depending on the particular application.

As described in more detail below, the memory interfaces 105 are each coupled to the respective input/output expander using direct physical signal lines. Each input/output expander is coupled through a serial bus 137 to the corresponding VPP. The serial bus can be shared by one or many input/output expanders.

Figure 2:
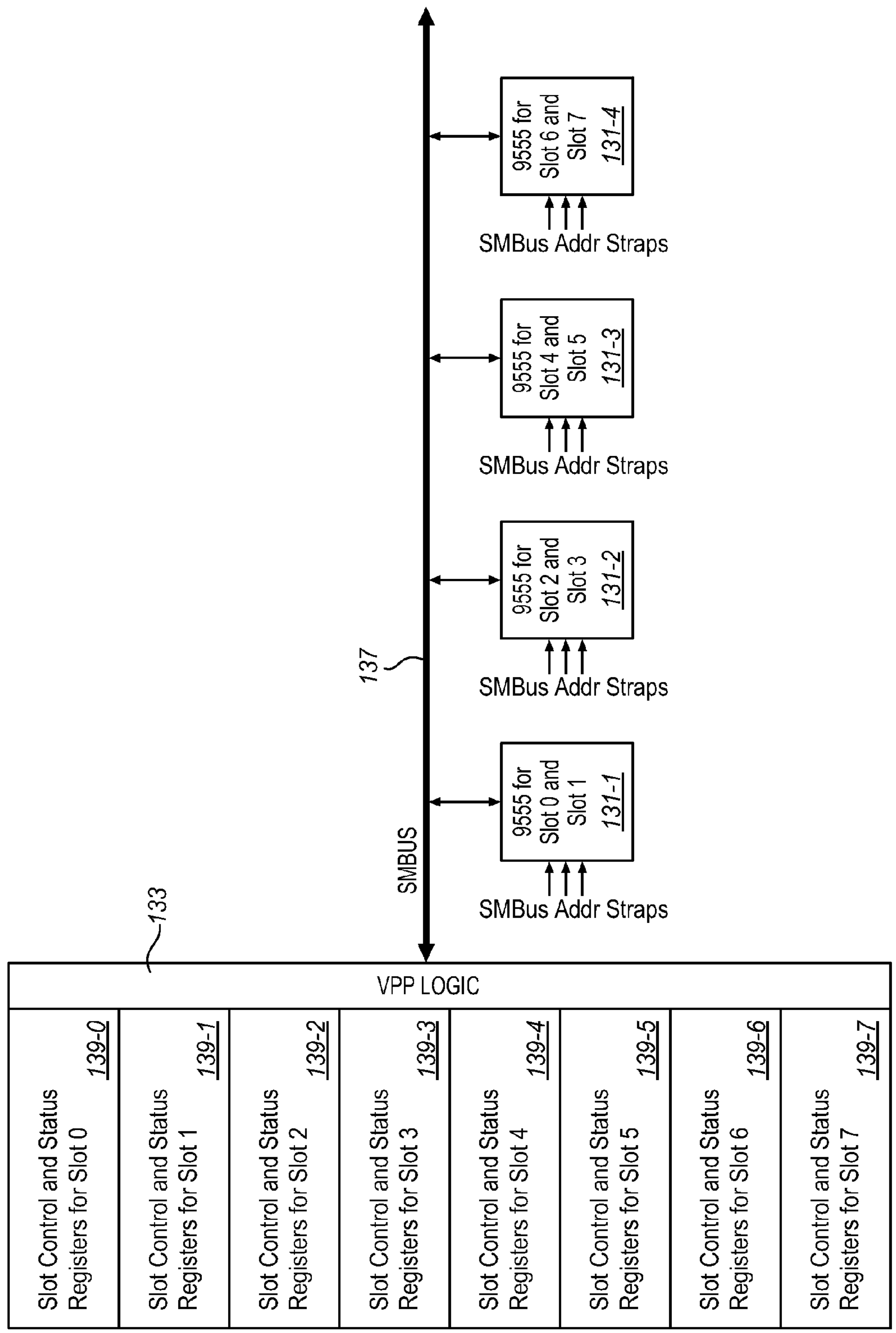
FIG. 2 is a block diagram of virtual pin port logic coupled to control and status registers and to a memory slot bus according to an embodiment of the present invention.

FIG. 2 shows further details of the connection between the VPP 133 and each of the input/output expanders 131-1 to 131-4 in more detail. In FIG. 2, the VPP 133 is coupled to a serial bus 137. In one example, this is a system management bus (SMBus as defined by Intel Corporation). However, any of a variety of other serial buses may be used including a power management bus (PMBus defined by Intel Corporation). The SMbus allows many different signals to be communicated specifically to each IOX expander using data packets that each contain an address to a particular node, such as a particular IOX, followed by a data field. The details of such a serial bus may be adapted to suit any particular application. In some embodiments, SMbus or a similar technology may be used to connect a variety of different devices that all are connected to the same bus. The IOX units can be coupled to a bus which is then shared with different types of devices, such as a variety of different power management and control devices. In one example, this shared bus of devices works to form an ACPI (Advanced Configuration and Power Interface) compatible interface.

As shown in FIG. 2, the VPP includes slot control and status registers for each slot of each memory interface 105. FIG. 2 shows slot control and status registers for slot zero 139-0 thru slot seven 139-7. The number of slot control and status registers may be adapted to suit the particular architecture. More or fewer registers may be used depending on the application.

Figure 3:
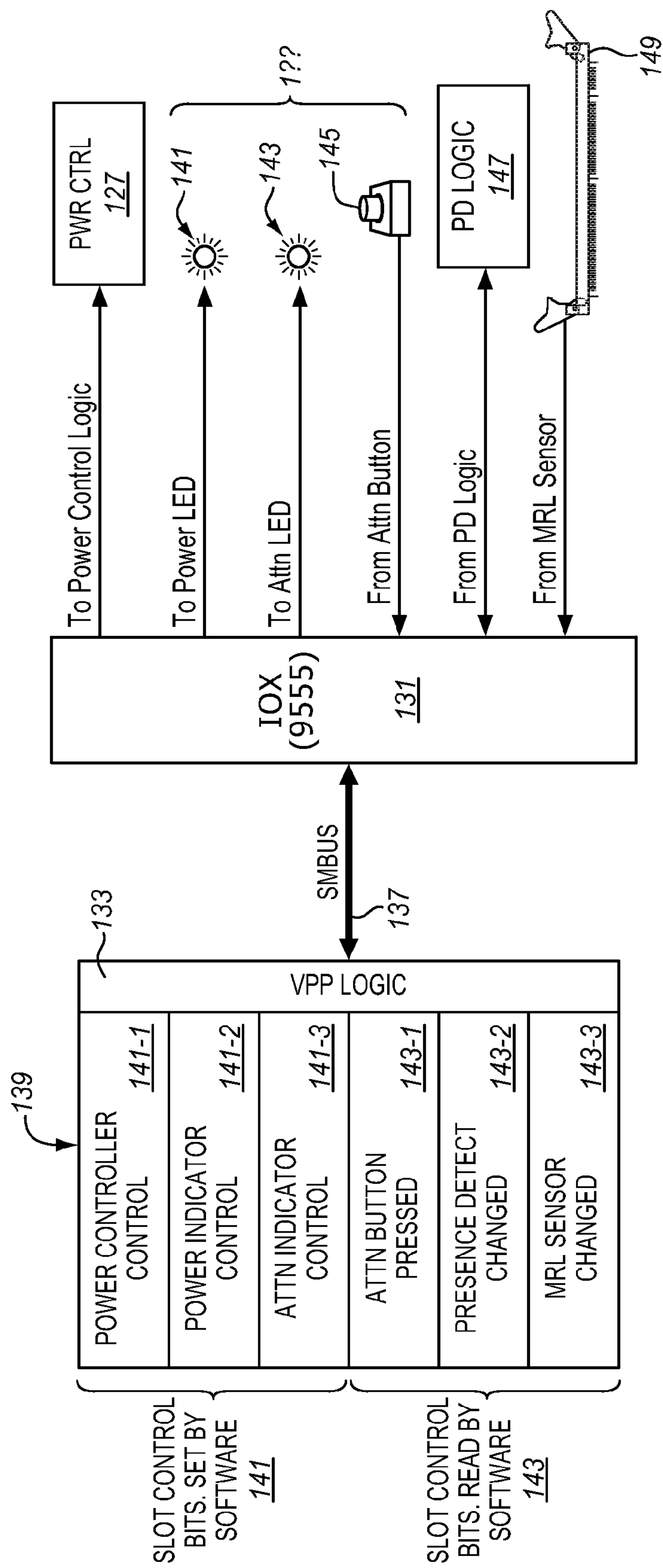
FIG. 3 is a diagram of a memory slot interface coupled to slot control and status registers through a bus interface according to an embodiment of the present invention.

Referring to FIG. 3, further details of the bus and memory interface for one memory interface 105 are shown. In FIG. 3, the memory interface 105 includes a power indicator such as an LED 141, an attention indicator such as an LED 143, an attention button such as a simple electrical switch 145, presence detect logic 147, and a manually operated retention latch (MRL) sensor 149. Each memory interface may include more or fewer components than described and shown. Each memory interface may also include a slot or memory board riser into which a memory board may be inserted or removed to provide random access memory (RAM) or some other type of memory to the memory controller and corresponding processor. The use of each of these devices for any particular application can be better understood from the description below. Each of the components of the memory interface 105 shown in FIG. 3 may be coupled to an input/output expander 131. In one example, this input/output expander is formed from a TCA9555 or a PCA9555 SMBus Interface chip available from Texas Instruments Inc.

The IOX 131 has a physical line wire interface to the slot interface 105 including the power indicator, attention indicator, attention button, presence detect logic, and MRL sensor. The presence detect logic 147 may or may not be a part of the slot interface. The IOX also has an interface to power control logic 127 which may be part of a slot interface but is typically located in another location for power control for all of the memory slots. A typical IOX such as those mentioned above may have enough interface ports and connections to connect to more than one memory slot. In the example of FIG. 2, each IOX connects to two memory slots. The particular number of slots and the specific connections to each slot interface will depend on the particular application. The bus interface 131 also has an interface to a serial bus 137. This bus connects directly to the VPP logic 133 as described in the context of FIG. 2.

FIG. 3 shows registers contemplated for the VPP 133 of FIGS. 1 and 2 for a particular slot interface. So, for example, the slot control and status registers 139 can be divided into two groups, a first group 141 are set by software through the memory controller and the processor. In the illustrated example, these bits include power controller control bits 141-1, power indicator control bits 141-2, and attention indicator control bits 141-3. In a simple example, by setting a power controller control bit at either 0 or 1 through software or firmware, this bit can be sent through the SMbus 137 to the bus interface 131 and then to the power control logic 127. One bit value can indicate that the power should be turned on while the opposite bit value can indicate that the power should be turned off. This allows the software or firmware to control the power supply to the memory interface or to the memory slot.

Similarly, a power indicator control bit can be set to either 0 or 1. This bit status can be sent through the SMbus to the power LED 141 to turn the LED on or off and even to make it flash using a flash command or by changing the control bit back and forth. Similarly, the attention indicator control bit can operate the same way through the SMbus to turn the attention indicator 143 on or off.

Another set of bits 143 can be written by the bus interface 131 into the status registers. In the illustrated example of FIG. 3, an attention button press bit 143-1 can be written to indicate when the attention button is pressed. A presence detect bit can be written by the bus interface 131 through the SMbus 137 to indicate that the presence detect logic has detected or has not detected the presence of a memory board in the memory slot interface. Similarly, an MRL sensor bit 143-3 can be written in response to the MRL sensor 149 detecting the latches of a memory slot being closed or open. The slot status bits 143 can be read by the BIOS, firmware, or operating system to determine the status of a memory slot and to start or stop hot swap operations as described below. More or fewer status and control bits than those indicated in the drawings may be used depending on the particular application. The communication between the bus interface 131 and the slot control and status registers 139 may also be adapted to suit the particular system configuration and the desired functions.

As seen in the Figures, the VPP logic in the hot-plug controller acts like a parallel to serial converter and the IOX (IO Expander) in the motherboard acts like a serial-to-parallel converter. The serial interface requires only 2 pins. From the perspective of the software of firmware, this parallel-serial-parallel operation is transparent. For example, software writes to the attention indicator control (on the left), and the corresponding Attention Indicator signal (on the right) responds. In another example, the user presses the attention button (on the right) and the corresponding status register (on the left) gets set.

For example, the Figures show an implementation of VPP logic that controls 8 memory hot-plug slots. In this case, this requires 4 IOXs. Each IOX is strapped to non-conflicting SMBus addresses, within this SMBus segment. For addressing, the VPP Logic may use the SMBus address and the IOX Port No. that corresponds to each slot. The address and port No. map the Slot control and Status registers to the corresponding IOX. This information may be programmed into the VPP Logic by the system firmware.

Figure 4:
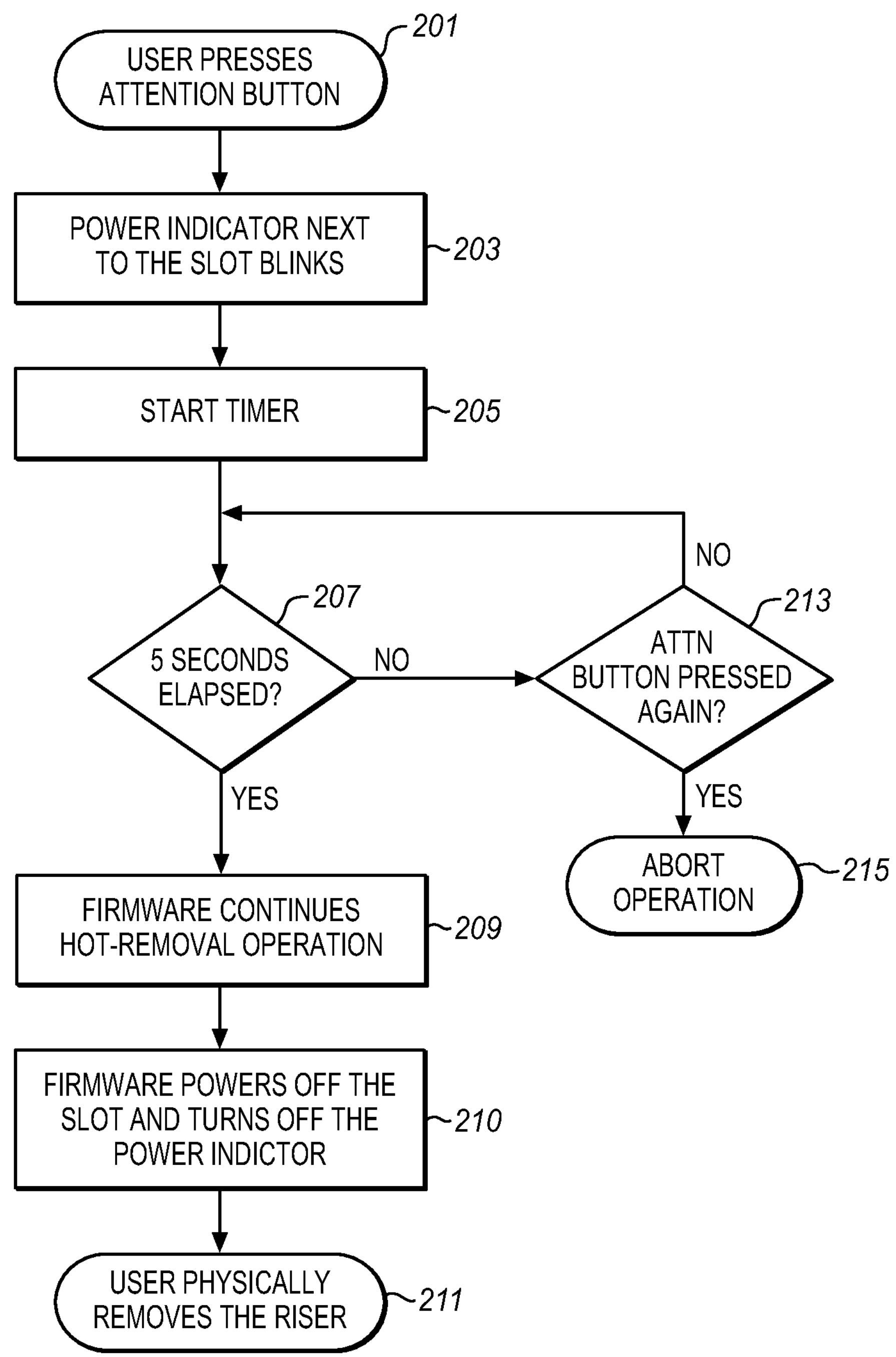
FIG. 4 is a process flow diagram of removing memory during system run-time according to an embodiment of the present invention.

FIG. 4 shows an example of a process for removing a memory board while the system is in run-time. In the particular example of FIG. 4, this process is initiated using the attention button 145. At block 201, the user selects a slot. In the system of FIG. 1, such a slot may be a powered riser or slot interface. The user then presses the attention button. The effect of pressing the attention button is to submit a request to the system firmware, BIOS, or operating system through the control registers of the VPP that the memory board in that memory slot be released for removal. At block 203, the system indicates to the user that the attention button press has been recognized. In the particular example of FIG. 4, the power indicator blinks as the indication to the user.

In the architecture of FIG. 1, each memory slot interface may have its own power indicator, attention indicator, attention button and some system of determining whether a memory board is installed into a particular slot. In the examples above, this system is through presence detect logic or an MRL sensor or both. Depending on the particular application, any one or more of the indicators and buttons may be shared between one or more slots. At block 205, after the power indicator starts blinking, a timer is started either in firmware or by the operating system. This timer in the current example is a five second timer. So at block 207, after five seconds have elapsed, the firmware continues the hot removal operation at block 209.

At block 210, the firmware powers off the slot and turns off the power indicator. At block 211, the user, seeing that the power indicator has been turned off, removes the memory board from the memory slot. As part of continuing a hot removal operation, at block 209, the firmware sends an indication to the operating system or to firmware or to some other agent, as appropriate, to stop use of the corresponding memory board so that, when the memory board is removed, no important data is lost.

Returning to the timer, at block 207, the timer waits to see if the attention button is pressed again by the user at block 213. If the attention button has been pressed, then at block 215 the hot removal operation is aborted. The timer allows the user to cancel a hot removal operation if, for example, the wrong button has been pushed for any other reason such as an imminent power outage, etc.

In the present example, there is only one button for the user to push, the attention button. However, additional or other buttons may be used if desired. Alternatively, the process could be initiated through a user interface 117 by issuing commands to the operating system which would then indicate to the firmware to allow a hot removal action. In this way, the attention button for example may be voided. FIG. 5 shows a hot addition process which may also be initiated using the attention button. In the example of FIG. 5, the user selects an empty slot and opens a memory a retention latch at block 231.

At block 233, system firmware receives the memory retention latch signal from the slot interface through the bus interface 131 into the VPP logic and slot status register. The firmware can then ensure that power to that memory slot is turned off. Turning off the power protects the memory board upon insertion. At block 235, the user inserts the memory add-in card. At block 237, the user closes the memory retention latch. This is detected by the MRL sensor 149 and signaled through the bus interface to the firmware. At block 239, the user can request that the slot be enabled by pressing the attention button. At block 241, the firmware can activate the power indicator next to the slot so that the indicator blinks, for example. This can indicate to the user, at block 243, that a timer has started. As in the example in FIG. 4, the timer allows the user an opportunity to abort the operation for any reason. At block 245, if five seconds have elapsed, then, at block 247, the firmware power on the slot. This allows any inserted memory board to be powered. At block 249, the firmware turns on the power indicator and, at block 250, the firmware continues the hot-add operation. This involves testing the memory card, determining its type, and updating the firmware memory status and available memory count to allow the memory board to be used by the operating system. Finally, at block 251, the hot addition operation is complete.

As in the example in FIG. 4, when the timer is started, at block 243, if the user presses the attention button again within five seconds then, at block 253, the press of the attention button is detected through the slot control bit status register 143-1 and the operation is aborted 255 by the system firmware.

The variety of different controls provided by the physical lines to the slot interface of FIG. 3 allow different operations many different variations on the processes shown in FIG. 4 and in FIG. 5. For example, the memory retention latches 149 may be used as an alternative to an attention button, either to request the addition or removal of a memory board. Alternatively, the attention button may be used to indicate both the request for hot removal or hot addition of a memory board. In either case, the attention LED or the power LED may blink to indicate that the request for a hot removal or hot addition has been received by the system firmware.

In both cases, there in a normal operation status in which each memory slot interface has an illuminated power indicator if a memory board is inserted and operational. If a memory slot is empty, then a power indicator is off. This convention allows an administrator to check the status of the memory slots to determine if the system is operating normally. In both cases, to indicate a possible transition, the power indicator next to the corresponding slot blinks. This indicates that the firmware has received a request and is waiting to determine whether the requested operation will be completed or aborted.

Reference throughout this specification to “an example,” “one embodiment,” or “an embodiment” means that a particular feature, structure, or characteristic described in connection with the embodiment is included in at least one embodiment of the present invention. Thus, appearances of such phrases in this specification do not necessarily all refer to the same embodiment. Furthermore, the particular features, structures, or characteristics may be combined in any suitable manner in one or more embodiments.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:

a memory slot to carry a memory board and to connect the memory board to a memory controller for read and write operations;

a logic device having a plurality of status registers to record the status of the memory slot and a plurality of control registers to control the operation of the memory slot; and a bus interface coupled through direct signal lines to the memory slot to communicate status and control signals with the memory slot and coupled through a serial bus using a bus address and a port No. to the logic device to communicate status and control signals with the logic device, the bus address identifying the bus interface and the port No. identifying the memory slot.

2. The apparatus of claim 1, wherein the bus interface is further coupled through at least a portion of the direct signal lines to a user interface.

3. The apparatus of claim 2, wherein the user interface comprises an attention indicator and to an attention switch.

4. The apparatus of claim 2, wherein the user interface comprises a power indicator and a power switch.

5. The apparatus of claim 1, wherein the bus interface is further coupled to power control logic to control power supplied to the memory slot.

6. The apparatus of claim 1, wherein the logic device is coupled to a memory controller and wherein the memory controller writes to the control and status registers.

7. The apparatus of claim 1, wherein the logic device writes to the control and status registers based on instructions from an operating system.

8. The apparatus of claim 1, further comprising a plurality of bus interfaces each coupled to a memory slot though respective physical direct signal lines, each bus interface also being coupled to the logic device through the serial bus, wherein the serial bus is shared by the bus interfaces.

9. The apparatus of claim 1, wherein the logic device includes control and status registers for each memory slot.

10. The apparatus of claim 1, wherein the serial bus is a two-line bus.

11. The apparatus of claim 1, wherein the serial bus is a system management bus.

12. A method comprising:

receiving an attention signal corresponding to a memory slot on a system board through a direct signal line coupled to an addressable bus interface, the attention signal indicating a request to remove a memory board from the memory slot during system run-time;

transmitting the received attention signal from the bus interface through a serial bus to a memory controller;

indicating receipt of the attention signal to a user interface;

turning off power to the memory slot during system board run-time including updating a status register of the memory controller; and indicating the power off status of the memory slot to a user interface.

13. The method of claim 12, wherein receiving an attention signal comprises detecting a button press corresponding to a memory slot at a bus interface having a physical connection to the button and transmitting an indication of the detected button press through a serial bus from the bus interface to the memory controller.

14. The method of claim 12, further comprising updating a second status register of the memory controller to indicate the received attention signal.

15. The method of claim 12, further comprising providing the attention signal to firmware for the system board using the second status register, providing the attention signal to an operating system for the system board using the second status register, and wherein turning off power comprises turning off power after receiving a response from the firmware and the operating system.

16. The method of claim 15, wherein receiving a response from the operating system comprises receiving a power controller status register update.

17. The method of claim 12, wherein turning off power comprises indicating receipt of the power controller status register update to power control logic for the memory slot.

18. A method comprising:

receiving an attention signal corresponding to a memory slot on a system board through a direct signal line coupled to an addressable bus interface, the attention signal indicating a request to add a memory board to the memory slot during system run-time;

transmitting the received attention signal from the bus interface through a serial bus to a memory controller;

indicating receipt of the attention signal to a user interface;

detecting the installation of the memory board in the memory slot;

turning on power to the memory slot during system board run-time; and indicating the power on status of the memory slot to a user interface.

19. The method of claim 18, wherein receiving an attention signal comprises detecting a button press corresponding to a memory slot at a bus interface having a physical connection to the button and transmitting an indication of the detected button press through a serial bus from the bus interface to the memory controller.

20. The method of claim 18, further comprising updating a second status register of the memory controller to indicate the received attention signal.

21. The method of claim 18, further comprising providing the attention signal to firmware for the system board using the second status register, providing the attention signal to an operating system for the system board using the second status register, and wherein turning on power comprises turning on power after receiving a response from the firmware and the operating system.

22. The method of claim 21, wherein receiving a response from the operating system comprises receiving a power controller status register update.

23. The method of claim 18, wherein turning on power comprises indicating receipt of the power controller status register update to power control logic for the memory slot.

* * * * *